(12) United States Patent
Brugger et al.

(10) Patent No.: US 9,617,006 B2
(45) Date of Patent: Apr. 11, 2017

(54) EMERGENCY POWER SYSTEM FOR AN AIRCRAFT

(75) Inventors: Ralf Brugger, Wangen i. A. (DE); Jörn Frick, Ravensburg (DE); Jacques Herzog, Simmerberg (DE); Dirk Metzler, Oberreute (DE)

(73) Assignee: Liebherr-Aerospace Lindenberg GmbH, Lindenberg (DE)

( * ) Notice: Subject to any disclaimer, the term of this patent is extended or adjusted under 35 U.S.C. 154(b) by 1164 days.

(21) Appl. No.: 13/139,066

(22) PCT Filed: Dec. 11, 2009

(86) PCT No.: PCT/EP2009/008880
§ 371 (c)(1),
(2), (4) Date: Jun. 10, 2011

(87) PCT Pub. No.: WO2010/066440
PCT Pub. Date: Jun. 17, 2010

(65) Prior Publication Data
US 2011/0240795 A1 Oct. 6, 2011

(30) Foreign Application Priority Data

Dec. 12, 2008 (DE) .................. 10 2008 062 038
Oct. 22, 2009 (DE) .................. 10 2009 050 309

(51) Int. Cl.
*B64D 41/00* (2006.01)
*B64D 13/00* (2006.01)
(Continued)

(52) U.S. Cl.
CPC .............. *B64D 13/08* (2013.01); *B64D 41/00* (2013.01); *B60H 1/143* (2013.01);
(Continued)

(58) Field of Classification Search
CPC .. B64D 13/08; B64D 41/00; B64D 2041/005; B60H 1/143; B60H 1/00385;
(Continued)

(56) References Cited

U.S. PATENT DOCUMENTS 5,479,983 A * 1/1996 Fischer et al. ................. 165/205
6,216,981 B1 * 4/2001 Helm ............................. 454/76
(Continued)

FOREIGN PATENT DOCUMENTS

CN 201134052 Y 10/2008
DE 10102890 9/2001
(Continued)

*Primary Examiner* — Alissa Tompkins
*Assistant Examiner* — Phillip E Decker
(74) *Attorney, Agent, or Firm* — Dilworth & Barrese, LLP

(57) ABSTRACT

The present invention relates to an emergency power system for an aircraft having at least one fuel cell unit for producing electric power, wherein the fuel cell unit is cooled via at least one cooling circuit which includes at least one heat exchanger, and wherein the heat exchanger is connected to at least one air distribution system of the aircraft cabin so that exhaust air heated by the heat exchanger in the operation of the emergency power system can be distributed via the air distribution system in the aircraft cabin.

18 Claims, 15 Drawing Sheets

(51) Int. Cl.
*B64D 13/08* (2006.01)
*B60H 1/14* (2006.01)
*B64D 13/06* (2006.01)

(52) U.S. Cl.
CPC  *B64D 2013/0611* (2013.01); *B64D 2041/002* (2013.01); *B64D 2041/005* (2013.01); *Y02T 90/36* (2013.01)

(58) Field of Classification Search
CPC ... Y02T 90/36; H01M 6/5038; H01M 8/0267; H01M 10/60
USPC ............. 237/12.3 B, 12.3 A, 81, 12; 454/76; 429/901, 440
See application file for complete search history.

(56) References Cited

U.S. PATENT DOCUMENTS

| | | | |
|---|---|---|---|
| 6,296,957 B1* | 10/2001 | Graage | B64D 41/00 244/58 |
| 6,389,826 B2* | 5/2002 | Buchholz et al. | 454/76 |
| 6,454,180 B2* | 9/2002 | Matsunaga et al. | 237/12.3 B |
| 7,380,749 B2* | 6/2008 | Fucke et al. | 429/901 |
| 7,434,609 B2* | 10/2008 | Horn et al. | 62/244 |
| 8,132,737 B2* | 3/2012 | Eichholz et al. | 236/1 B |
| 8,336,609 B2* | 12/2012 | Schwan et al. | 454/76 |
| 8,685,581 B2* | 4/2014 | Scheibert | H01M 8/04059 429/433 |
| 8,722,272 B2* | 5/2014 | Westenberger | B64D 41/00 244/119 |
| 2002/0112494 A1* | 8/2002 | Harth | 62/239 |
| 2004/0108150 A1* | 6/2004 | Guidry et al. | 180/65.3 |
| 2005/0028968 A1* | 2/2005 | Kohle et al. | 165/202 |
| 2007/0158500 A1 | 7/2007 | Sridhar et al. | |
| 2008/0001026 A1* | 1/2008 | Hoffjann | B64D 11/02 244/58 |
| 2008/0070078 A1* | 3/2008 | Gummalla et al. | 429/26 |
| 2008/0210812 A1* | 9/2008 | Gans et al. | 244/58 |
| 2009/0104493 A1* | 4/2009 | Metzler | B64D 41/00 429/515 |
| 2010/0092822 A1* | 4/2010 | Hornburg | 429/26 |
| 2011/0036117 A1* | 2/2011 | Frohling et al. | 62/507 |
| 2011/0174006 A1* | 7/2011 | Arendt | B64D 13/00 454/74 |
| 2012/0118528 A1* | 5/2012 | Al-Ali | B64D 13/08 165/41 |
| 2015/0017559 A1* | 1/2015 | Klewer | H01M 8/04067 429/435 |
| 2015/0349356 A1* | 12/2015 | Ribarov | H02K 7/1823 290/1 A |
| 2016/0009409 A1* | 1/2016 | Rideau | B64D 41/00 290/44 |
| 2016/0036071 A1* | 2/2016 | Klewer | H01M 8/04029 244/53 R |
| 2016/0090189 A1* | 3/2016 | Wangemann | H02P 25/184 60/698 |

FOREIGN PATENT DOCUMENTS

| | | | |
|---|---|---|---|
| DE | 102005010399 | 4/2006 | |
| DE | 102006020145 | 11/2006 | |
| DE | 102006034814 | 1/2008 | |
| DE | 102006035621 | 2/2008 | |
| DE | 102007017820 | 8/2008 | |
| DE | 102008039782 | 3/2010 | |
| EP | 1057668 | 12/2000 | |
| EP | 1439082 | 7/2004 | |
| EP | 1902954 | 3/2008 | |
| JP | 2006-179404 A * | 7/2006 | |
| WO | WO 2007087974 A1 * | 8/2007 | ............ B64D 13/06 |
| WO | 2008/014912 | 2/2008 | |

* cited by examiner

EMERGENCY POWER SYSTEM FOR AN AIRCRAFT

The present invention relates to an emergency power system for an aircraft in accordance with the description herein. Emergency power systems which can provide electric power in an emergency by a fuel cell unit are known from the prior art. Waste heat arises in the operation of the fuel cell unit which has to be dissipated to ensure a proper function of the fuel cell unit. For this purpose, a cooling circuit can be provided in which a coolant circulates which takes up the waste heat of the fuel cell unit and outputs it via a heat exchanger.

SUMMARY OF THE INVENTION

The underlying object of the present invention is to ensure an efficient removal of waste heat of the emergency power system.

This object is satisfied by an emergency power system having the features herein. Provision is made in this respect that the heat exchanger is connected to at least one air distribution system of the aircraft cabin so that exhaust air heated by the heat exchanger in the operation of the emergency power system can be distributed via the air distribution system in the aircraft cabin. It is alternatively or additionally conceivable to cool the fuel cell system or the fuel cell itself, that is, to replace the heat exchanger with the fuel cell. The fuel cell or the fuel cell system then outputs the heat directly into the air distribution system. Such a fuel cell or such a fuel cell system can be additionally cooled via an above-mentioned cooling circuit, in particular via a water-operated cooling circuit. It is, however, preferred to carry out the variant in accordance with the description herein such that the cooling system for the fuel cell and thus also the heat exchanger are omitted, whereby a corresponding simplification of the system results.

In the variant of the air-cooled fuel cell, the injection of product water can be dispensed with since the product water is preferably output to the process air like the waste heat.

The aircraft cabin serves, as it were, in accordance with the invention as a heat buffer for the waste heat of the emergency power system or serves as an inner cooling.

It is conceivable to provide a plant for the evaporation of fuel cell product water and/or of water which was stored, via which plant the inflow air and/or the exhaust air of the heat exchanger is cooled. An increase in efficiency of the cooling is achieved in this manner.

To simplify the emergency power system, it is of advantage if the components of the emergency power system are arranged spatially close to one another. Advantageously, at least one, preferably a plurality of, and particularly preferably all components of the emergency power system is/are arranged in the pressurized region of the aircraft. Further advantageous embodiments of the emergency power system result from dependent claims 3 to 19. It is thus conceivable, for example, to carry out the fuel cell temperature regulation via the power regulation of the recirculation fan (in the following "RFAN") or of a fan (in the following "FCEPS FAN") which is associated with the emergency power system. With fans which are not continuously regulable or with fans which do not satisfy the aerodynamic demands of the fuel cell emergency power system, the temperature can be regulated via an ON/OFF control of the fan. The RFAN of the air distribution system is as a rule equipped with its own controller (Smart) which can be operated e.g. via a BUS combination (CAN) in the operating case of the FCEPS, i.e., in emergency operation, by the fuel cell controller using an alternative regulation signal.

The RFAN or RFANs have to be able to be supplied with power in an emergency. This can be achieved indirectly in that they are connected at the aircraft side to the emergency power network which is supplied with power by the fuel cell unit (in the following "FCEPS") in an emergency. Alternatively to this, it is also conceivable to implement a direct electric supply of the RFAN or RFANs in the FCEPS via a corresponding switching unit (relay, etc.). The term "fuel cell system" is also used in the following as a synonym for the term "fuel cell unit".

It is generally conceivable that the air for the heat exchanger (in the following "HX") or for the fuel cell system is sucked in or introduced from the environment of the system or also from any desired pipe/passage.

If a plurality of recirculation fans are provided, it is conceivable to connect the at least one exhaust air line and/or the at least one inflow air line of this plurality of or further recirculation fans in emergency operation, that is, optionally, to at least one exhaust air line and/or to at least one inflow air line of the heat exchanger HX and/or of the fuel cell system FCEPS by means of at least one connection line ("cross duct CD"). These cross ducts can be opened as required (emergency operation) by bypass valves BPV and can otherwise be closed by this valve.

Furthermore, at least one bypass valve BPV can be provided which is arranged such that a throughflow of a line of the air distribution system occurs in a first position of the valve, in particular a throughflow of the recirculation line of the air distribution system without the heat exchanger HX and/or the fuel cell system FCEPS being flowed through. Provision can be made in a second position of the valve that the heat exchanger HX and/or the fuel cell system FCEPS is flowed through, as is the case in emergency operation. Provision can be made in dependence on the arrangement of the valve that a recirculation filter RF is flowed through in normal operation, but in emergency operation a switch is made to bypass by the recirculation bypass valve and air is conducted directly via the HX and/or the fuel cell system FCEPS.

The following statements and embodiments or architectures are generally conceivable in so-called pressure operation and also in suction operation and are covered by the invention. The heat exchangers HX represented in FIGS. 1 to 15 can also be replaced by a fuel cell or by a fuel cell system FCEPS. Reference is made in this connection to the fact that the term fuel cell unit or fuel cell system FCEPS can relate to the fuel cell itself and also to a system or a unit whose component forms the fuel cell.

If the heat exchanger HX is replaced with the fuel cell or with the fuel cell system, the latter outputs heat directly into the air distribution system. An architecture of this arrangement is shown in FIG. 16. As stated the invention is, however, not restricted to this architecture, but also includes all embodiments in which the heat exchanger is replaced with a preferably air-cooled fuel cell or with a preferably air-cooled fuel cell system.

The present invention furthermore relates to an aircraft, in particular to an airplane, having at least one emergency power system in accordance with the description herein.

BRIEF DESCRIPTION OF THE DRAWINGS

Further details and advantages of the invention will be explained in more detail with reference to an embodiment shown in the drawings There are shown.

DESCRIPTION OF THE PREFERRED EMBODIMENTS

Figure 1:
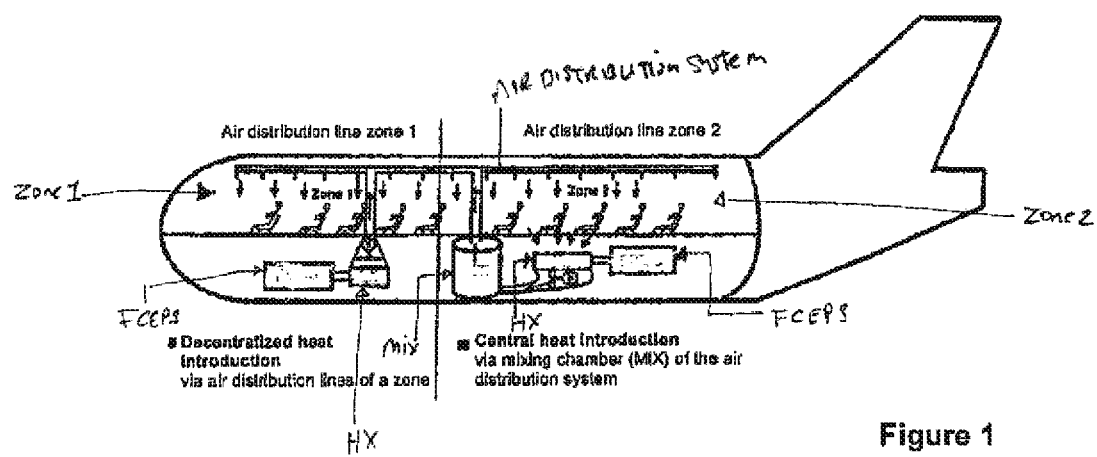
FIG. 1: a schematic representation of the operation of the emergency power system in pressure operation.

FIG. 1 shows in a schematic representation two zones (Zone 1, Zone 2) of an aircraft cabin which are supplied with inflow air via air distribution lines (air distribution line Zone 1; air distribution line Zone 2). An emergency power system which includes a fuel cell unit FCEPS and a heat exchanger HX is arranged in the pressurized space of the aircraft. The FCEPS and HX are connected to one another via one or more coolant lines. The coolant circulating through this coolant line takes up heat from the FCEPS. This heat is output in the HX. FIG. 1 shows with respect to Zone 2 a central heat introduction via the mixing chamber MIX of an aircraft air distribution system. The heated exhaust air of the HX is supplied to the MIX via a fan. From there, the air moves via one or more air distribution lines into Zone 2. Alternatively, a decentralized heat introduction via the air distribution line of an aircraft zone can also be provided, as is shown with respect to Zone 1. In this case, the exhaust air of the HX is not conducted into a mixing chamber, but directly into an air distribution line by means of a fan. In both cases, the waste heat of the FCEPS or of the HX is introduced into the aircraft air distribution system via a fan (pressure operation).

Figure 2:
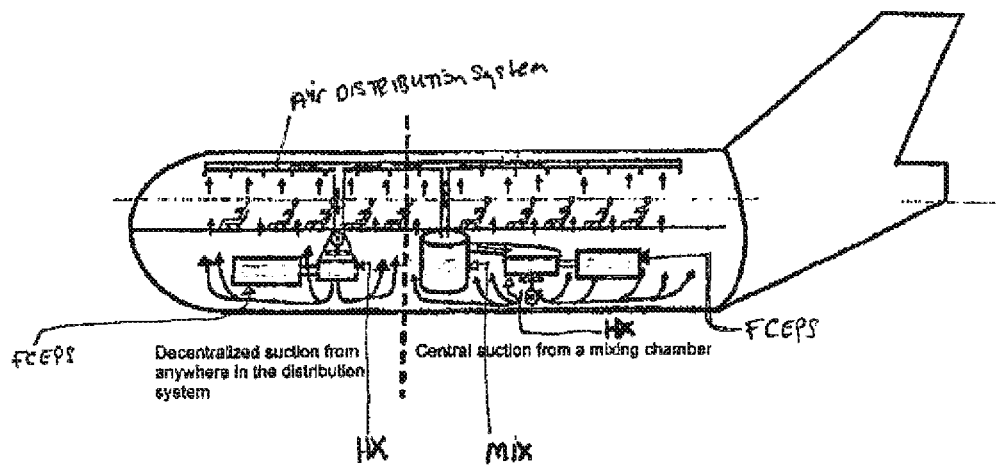
FIG. 2: a schematic representation of the operation of the emergency power system in suction operation.

FIG. 2 shows an embodiment in suction operation. Air is used there for cooling the HX centrally from the MIX or decentrally from some other location of the aircraft air distribution system. In the central suction from a mixing chamber (FIG. 2, right half of the Figure), air is sucked from the MIX and thereby out of the cabin (which also includes the cockpit, avionics, etc. within the framework of the invention). In the arrangement in accordance with FIG. 2, left half of the Figure, the air is not sucked from a MIX, but rather from an air distribution line and then supplied to the HX. Care must be taken that no short-circuit flow arises between the recirculation inlets and the HX exhaust air side. An advantage of the suction operation is that a flow toward the passengers takes place with much cooler air than in pressure operation. This is due to the fact that in suction operation heat is output to the underfloor region before the air is introduced into the cabin.

Both variants (centrally via MIX or decentrally, i.e. not via MIX) both in pressure operation and in suction operation are covered by the invention. FIGS. 3 to 13 show architectures which can be implemented both in pressure operation and in suction operation, with both modes of operation being included by the invention.

Figure 3:
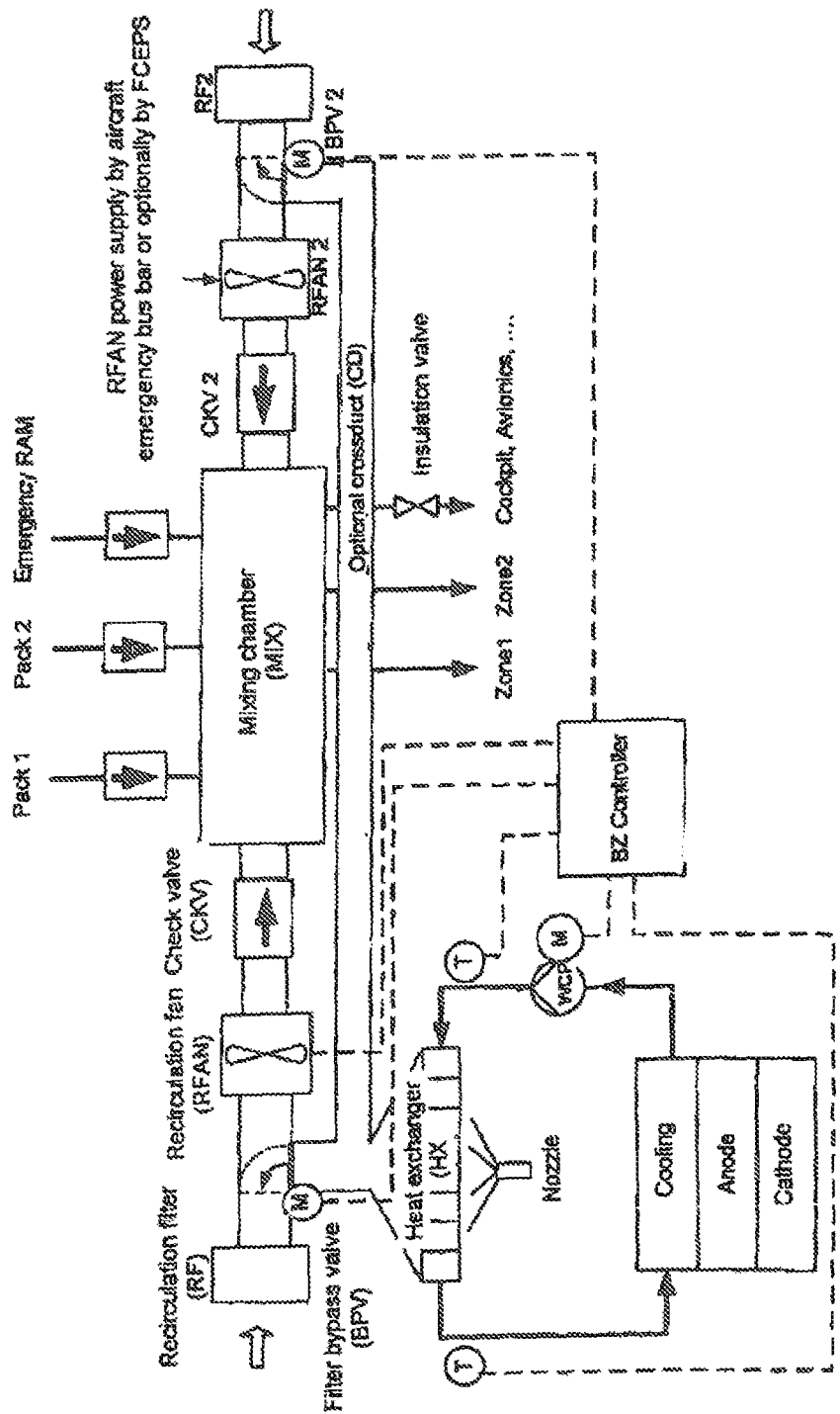
FIG. 3: a schematic representation of an architecture with a central heat introduction with RFANs and free suction.

FIG. 3 shows an architecture with a central heat introduction in the MIX in which no fan is provided which is provided separately for the HX. One or more of the anyway present recirculation fans RFAN, RFAN2, which belong to the air distribution system of the aircraft, serve for flowing through the HX. Air is sucked over the HX by means of the RFAN in emergency operation. The position in which the exhaust air passage of the HX opens into the line leading into the MIX or opens into the recirculation line is located between an upstream recirculation filter (in the following "RF") and the RFAN. The RF has the function of purifying the circulated air from the cabin" This purification function is no longer necessary for the short-term use of an FCEPS in emergency operation and in another respect reduces the required fan power which is determined by the filter-dependent pressure loss. The recirculation filter bypass valve (in the following "BPV") is arranged and designed such that it enables a throughflow of the RF and of the RFAN in normal operation, with the air then being guided into the MIX through the check valve (CKV). In emergency operation, the BPV is then switched over so that the air is not sucked through the RF by means of the RFAN, but rather directly via the exhaust air passage of the HX. If a plurality of RFANs, RFAN 2s are present, cooling air for the HX can be supplied via an additional connection line (crossduct (CD)), a connection between the exhaust air side of the HX and the air inflow line or exhaust air line of the further RFAN 2. A BPV2 can also be arranged on this side in order also to prevent the suction there via the second RF2 in emergency operation. This increases the FCEPS system availability and provides a redundancy, which positively influences the failure probability of the FCEPS system.

As further visible from FIG. 3, one or more isolation valves can be provided which prevent the inflow of exhaust heat in critical zones in emergency operation such as the cockpit or the aircraft avionics area. The isolation valve is open in normal operation and is closed in emergency operation. As further visible from FIG. 3, a "free suction" of the HX takes place, i.e. the air is not supplied through a line or the like, but is supplied from the environment.

Figure 4:
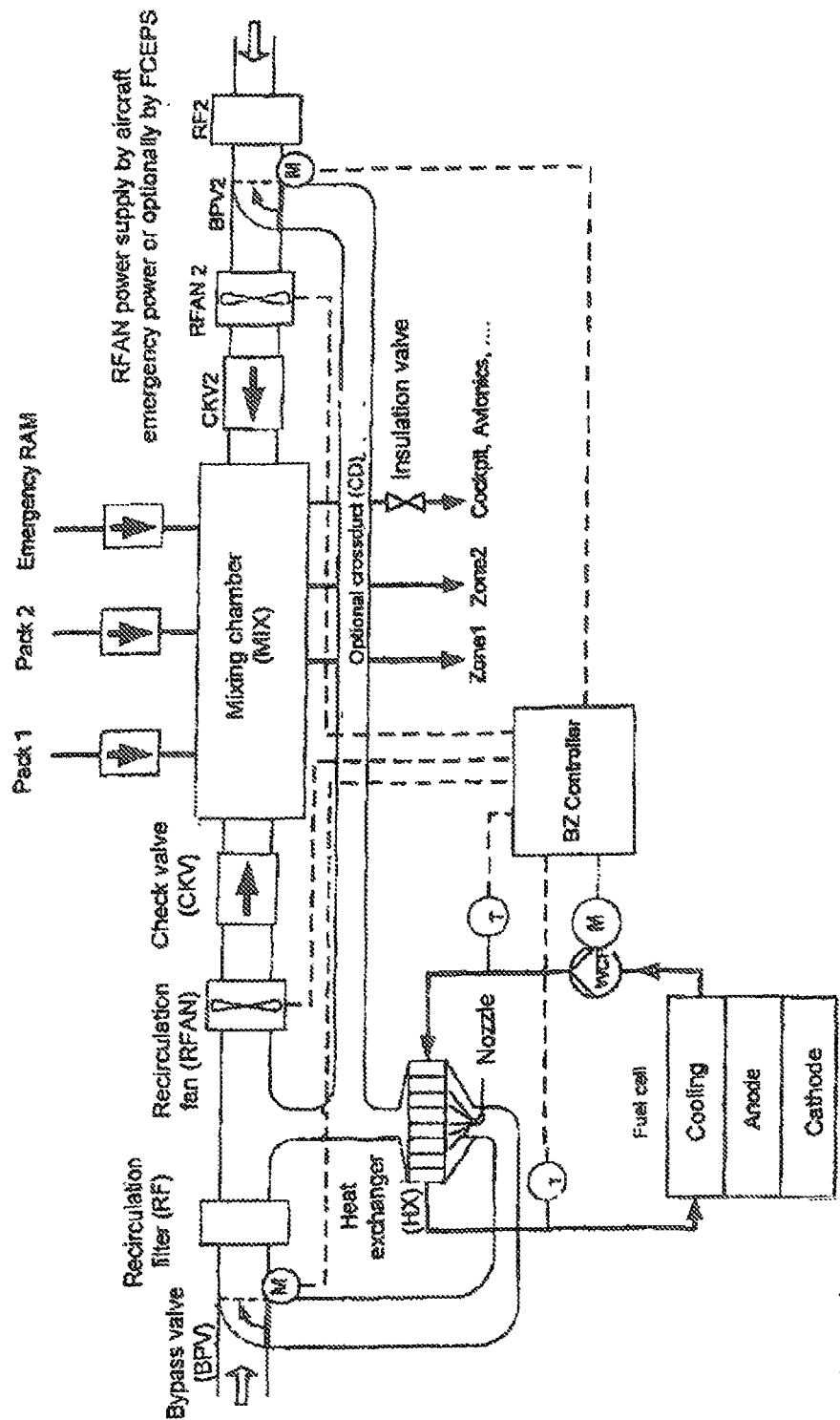
FIG. 4: a schematic representation of an architecture with a central heat introduction with RFANs and suction from an air passage.

FIG. 4 shows an arrangement with a central heat introduction in the MIX in which the inflow air of the HX is provided from an air passage. The inflow air passage of the HX branches off upstream or downstream of the RF and upstream of the RFAN from the line or recirculation line leading into the MIX, in which line the air flow through the RFAN is effected. In emergency operation, the BPV is closed, which has the consequence that the RF is no longer flowed through, but the air is rather sucked through the HX to the RF in parallel and in the bypass. A switchover to further RFAN2s can be implemented by one or more optional connection lines ("CDs" in the following). In this case, the air outlet side of the HX is connected to the input or output of the further RFAN2 or RFAN2s, with a BPV2 which blocks the CD or releases it in emergency also being provided here.

Figure 5:
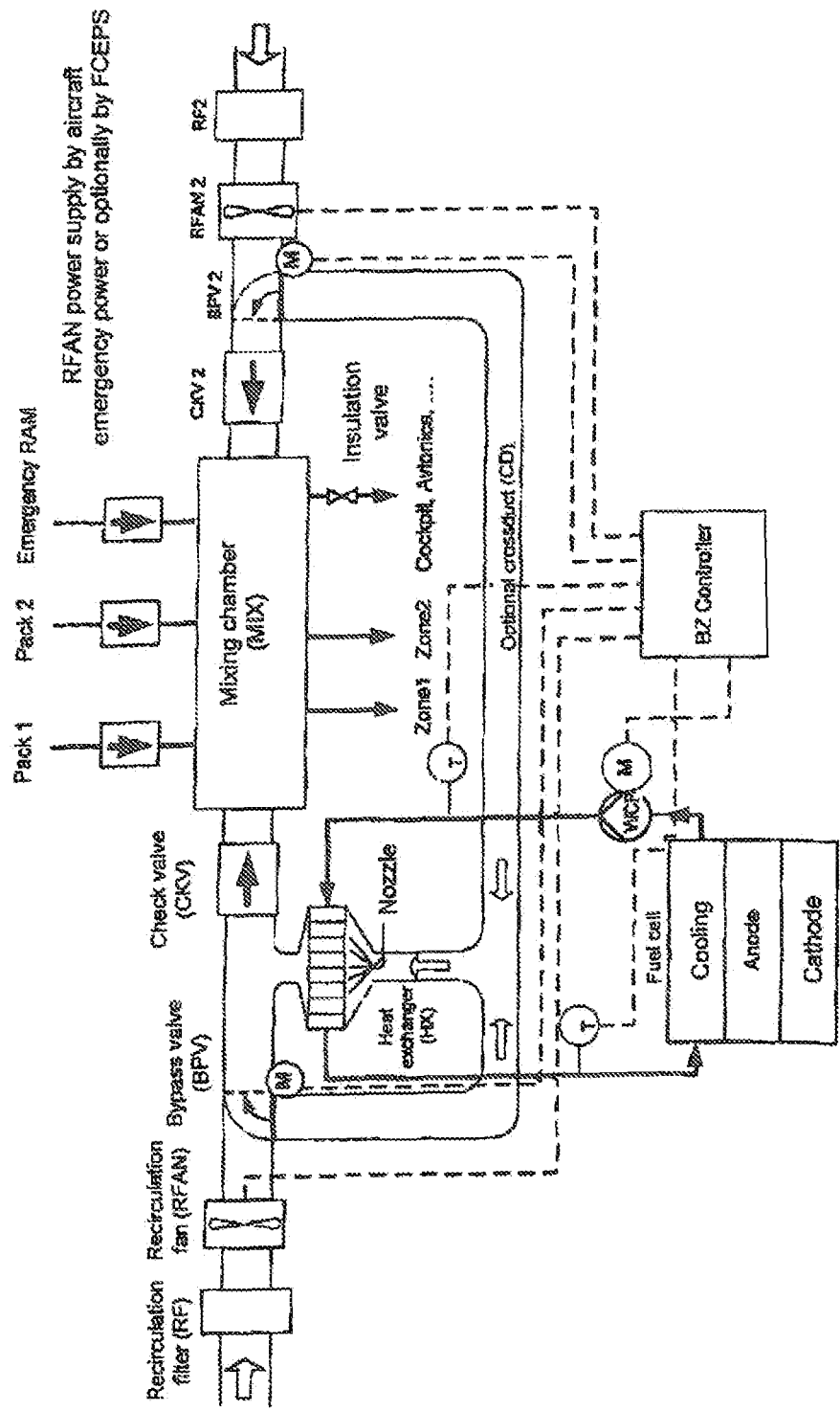
FIG. 5: a schematic representation of an architecture with a central heat introduction with RFANs and an arrangement of the HX downstream of the RFAN.

FIG. 5 shows an architecture with a central heat introduction in the MIX in which both the inflow air line and the exhaust air line of the HX open into the line or recirculation line, which leads into the MIX, downstream of the of the RF and of the RFAN. The HX receives the sucked in air via any desired air-conducting passage/pipe/line from the RFAN. The connection between the suction point and the following pipe system is also closed here via a BPV through which the air is blown over the HX in emergency operation. The HX exhaust air can take place directly after the BPV or alternatively also after a check valve (CKV). A switchover to further RFANs can also be implemented here to increase the availability on the presence of one or more further RFANs by one or more optional CDs. This connection line connects the air inlet side of the HX to the output of the further RFAN or RFANs (RFAN2). A further BPV2 can be necessary to effect the air flow into the CD. Said BPV2 is closed when air is conduced to the HX by means of the RFAN2.

Figure 6:
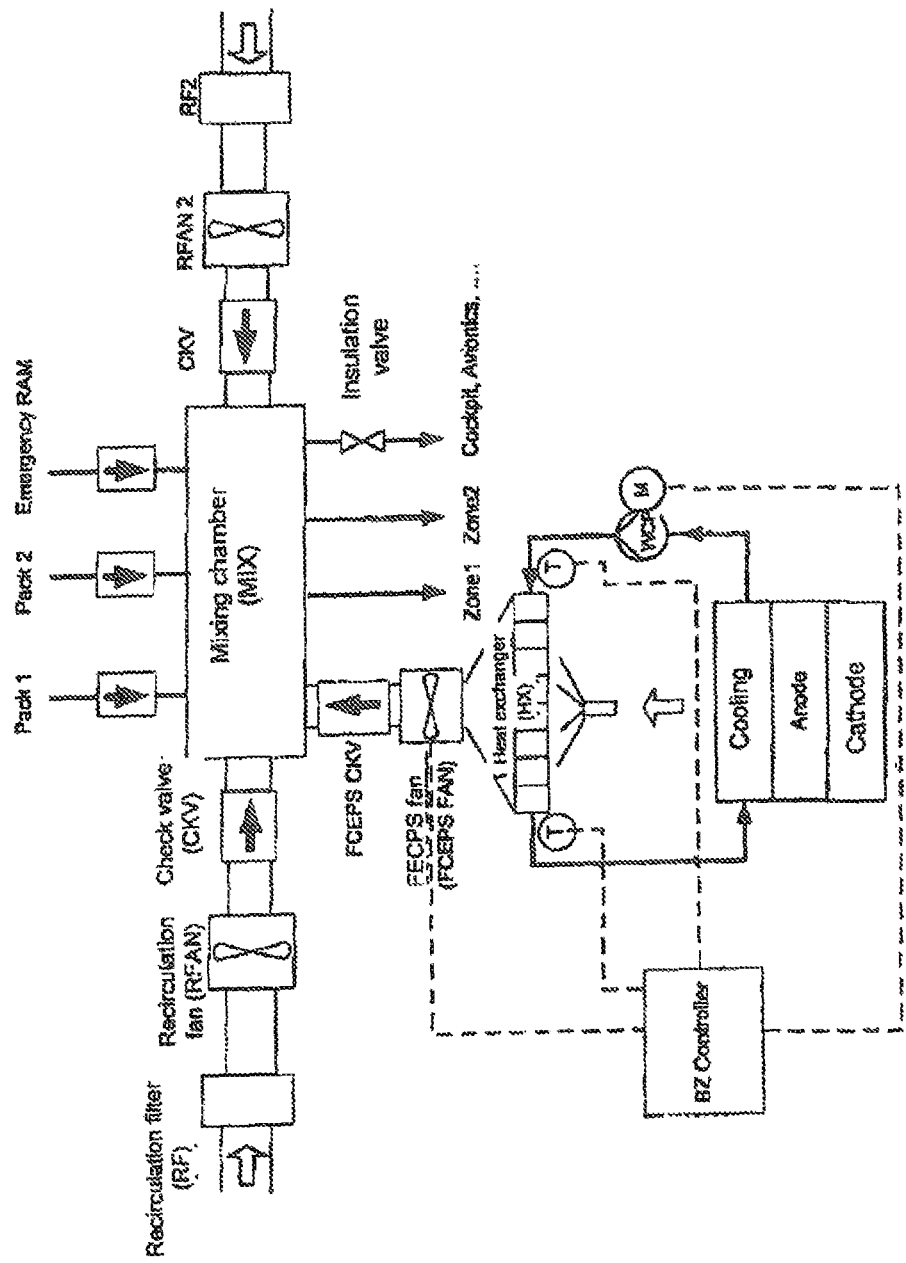
FIG. 6: a schematic representation of an architecture with a central heat introduction with a FCEPS FAN associated with the HX and free suction.

FIG. 6 shows an arrangement with a central heat introduction, wherein the waste heat of the HX is introduced centrally into the MIX via a separate fan (FCEPS FAN) of the HX or of the FCEPS and via an associated downstream valve (FCEPS CKV). The FCEPS CKV can be a passive check valve or an electric OPEN/CLOSED valve. In the case shown in FIG. 6, the air supply for the HX takes place freely from the environment of the HX. The FCEPS FAN can selectively be provided before and/or after the HX. An additional bypass valve is not necessary, in contrast to the architectures in accordance with FIGS. 3 to 5.

Figure 7:
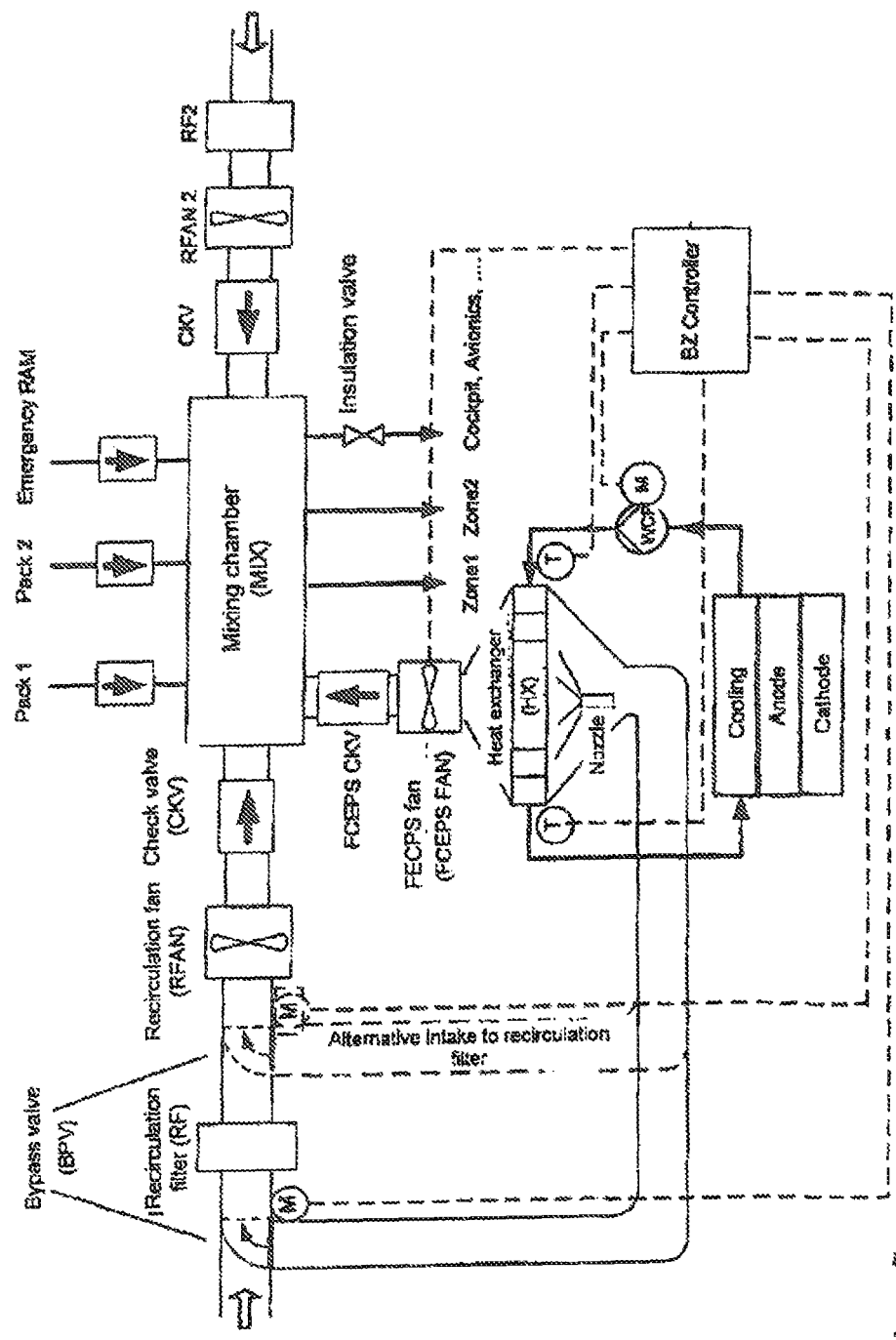
FIG. 7: a schematic representation of an architecture with a central heat introduction with a FCEPS FAN associated with the HX and suction from a pipe/passage.

FIG. 7 shows the arrangement with a central heat introduction into the MIX, in which the exhaust air side of the HX corresponds to the arrangement in accordance with FIG. 6. The inflow air of the HX is, however, supplied from any desired air-conducting pipe/passage which branches off in front of the FRAN and downstream or upstream of the RF from the line or recirculation line leading into the MIX. If suction takes place before the RF, the advantage of a smaller pressure loss results. As already described above, one or more BPV(s) is/are provided which, in normal operation, release(s) the throughflow of the line or recirculation line which leads into the MIX and in which the RF and the RFAN are arranged. In emergency operation, this line is closed and the air is conducted via the branch line to the inlet of the HX.

FIGS. 8 to 13 show arrangements with a decentralized heat introduction, preferably directly (but at least not via MIX) into an air distribution line of a zone. The system can hereby be arranged very flexibly in the fuselage and outside the critical "rotor burst zone" which is located between the engines, and can, for example, be installed in the rear part of the aircraft.

Figure 8:
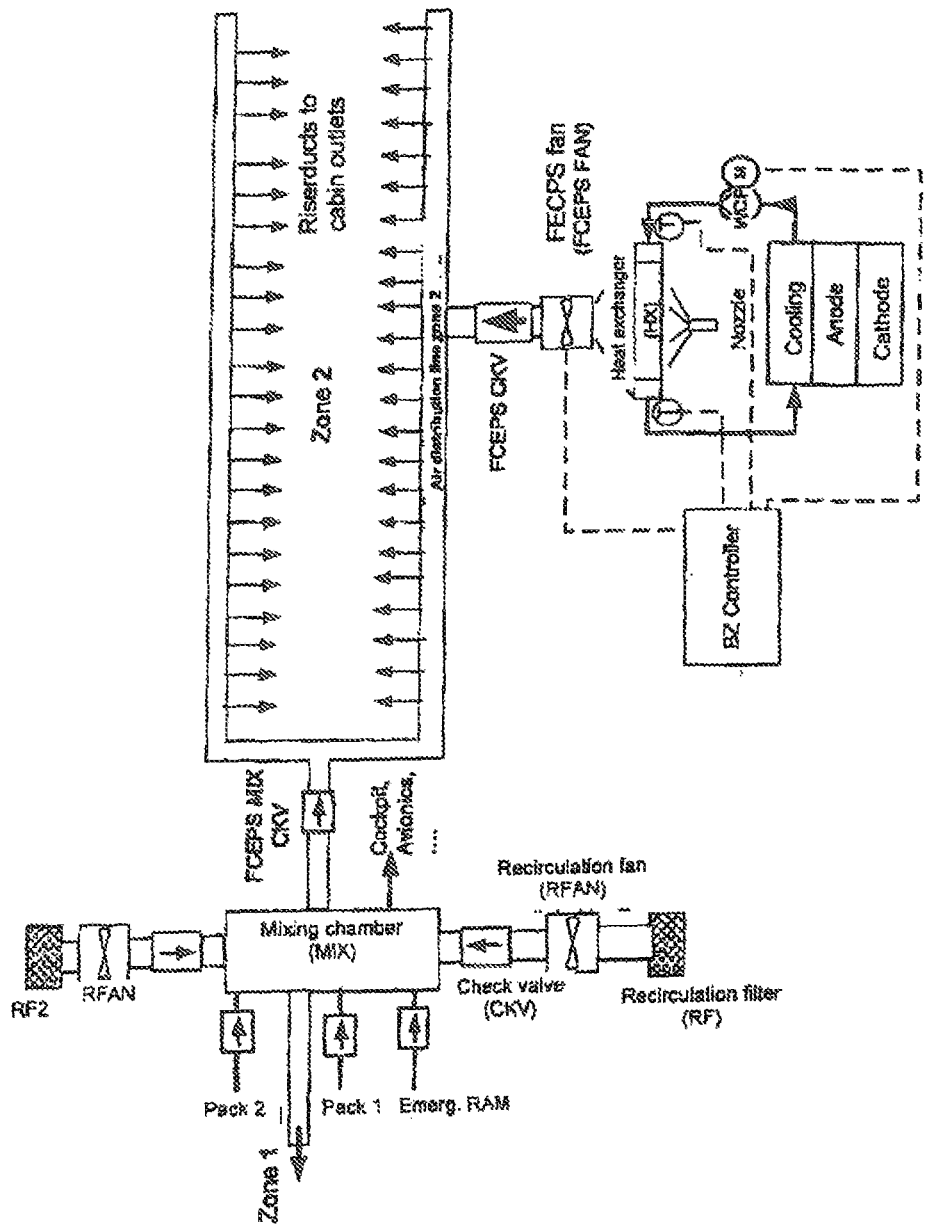
FIG. 8: a schematic representation of an architecture with a decentralized heat introduction into an air distribution system of an aircraft zone and free suction.
Figure 9:
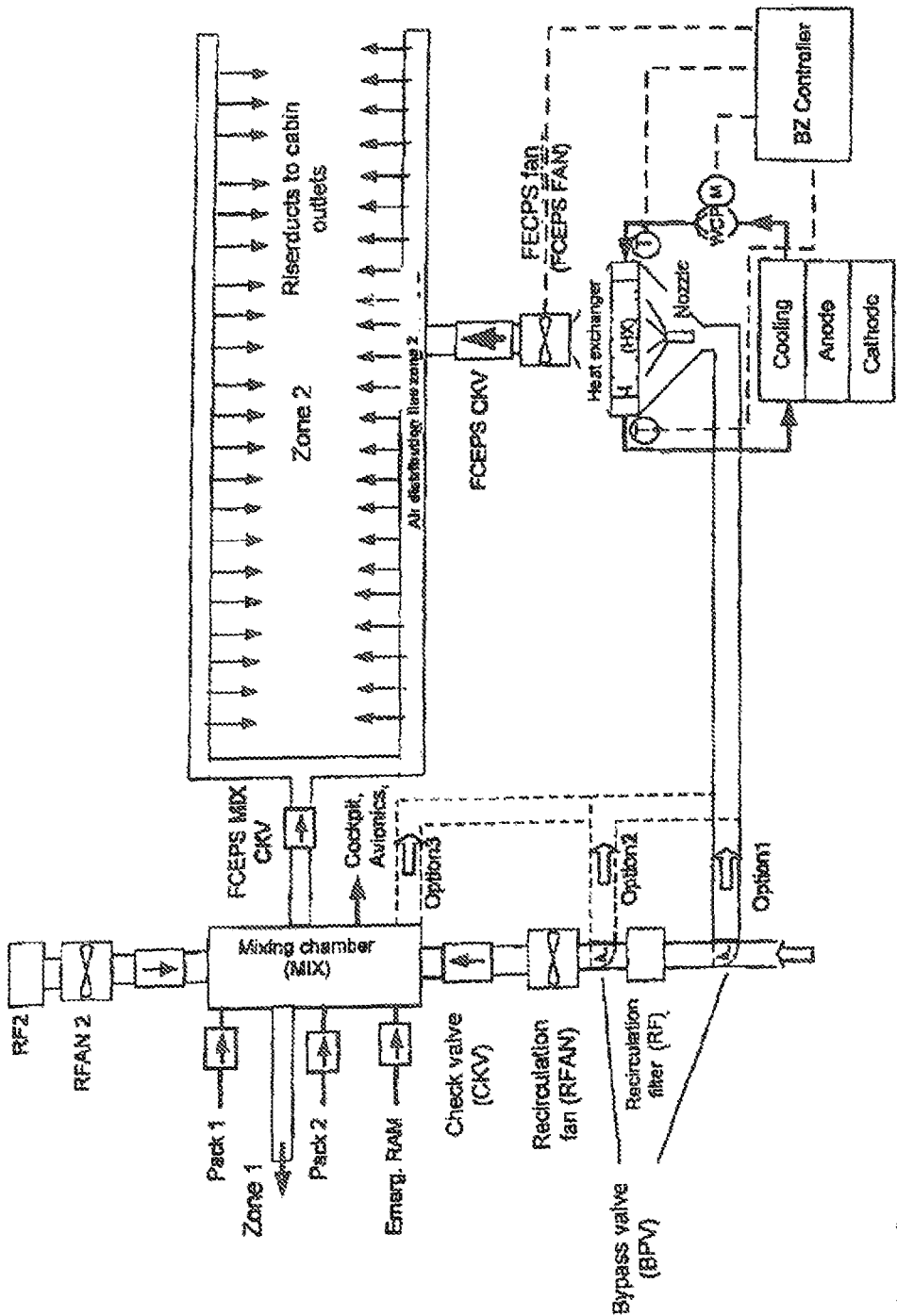
FIG. 9: a schematic representation of an architecture with a decentralized heat introduction into an air distribution line of an aircraft zone with suction from a pipe-/passage.

FIG. 8, as also FIG. 6, shows that the air is conducted over the HX by means of a separate fan (FCEPS FAN) and by means of a subsequently arranged check valve (FCEPS CKV). In contrast to FIG. 6, the air is not supplied into the MIX, but rather into an air distribution line or air distribution rail. The line can have the designation "distribution manifold" or "supply duct". In normal operation, air is supplied to the air distribution lines from the MIX. As visible from FIG. 8, an additional valve (FCEPS MIX CKV) (mechanical check valve or electric ON/OFF valve) which prevents a backflow of the air into the MIX for an emergency, i.e. for the operation of the FCESP, can be arranged in at least one of these lines. A waste heat introduction of the exhaust heat of the HX into critical zones such as cockpit or avionics, which are usually supplied by the MIX, can hereby also be prevented. An additional isolation valve is not required in this case. The FECPS fan can be arranged before and/or after the HX. FIG. 9 shows an arrangement with a decentralized heat introduction which corresponds to that of FIG. 8 at the HX exhaust air side. There is a difference in that the inflow air is not supplied to the HX from the environment, but rather from any desired part of the air distribution system of the aircraft. The HX inflow line branches off, upstream of the RF and of the RFAN, from the line or recirculation line leading into the MIX (Option 1), between the RF and the RFAN (Option 2) or directly from the mixing chamber (Option 3). In this case, as well as also in the previously described cases, the FCEPS CKV located downstream of the HX can be designed either as a mechanical or as an electric OPEN/CLOSED valve. The air flow is implemented by means of one or more BPVs, as is shown in FIG. 9. If the BPV is arranged downstream of the RFAN or if the air inflow line of the HX branches off downstream of the RFAN, a separate fan FCEPS FAN of the HX or the FCEPS can be dispensed with since in this case, the RFAN is utilized for the cooling air supply.

Figure 10:
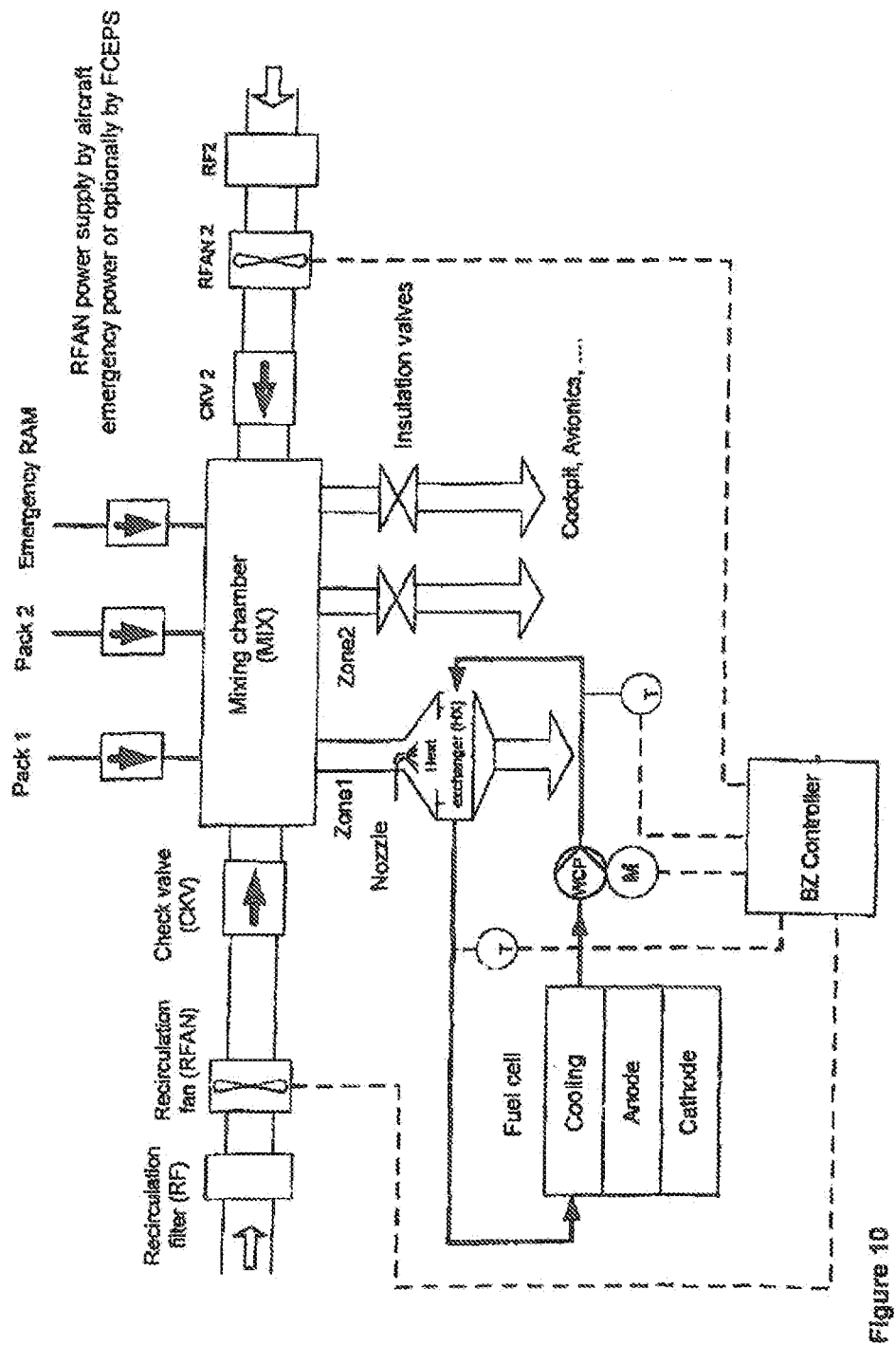
FIG. 10: a schematic representation of an architecture with a decentralized heat introduction with RFANs and an arrangement of the HX in a zone outflow.

FIG. 10 shows an arrangement with a decentralized heat introduction, wherein the HX is arranged directly in one of the available zone outlets of the MIX. The cooling air can be delivered by one or more RFANs, RFAN2s. The isolation valves are necessary to block the air injection into further zones which are supplied from the MIX. No additional check valves are required. On integration of the HX into the zone with the smallest pressure los, the heat exchanger can replace or supplement the otherwise necessary restriction (for the uniform air distribution). One or more separate fans (FCEPS FAN) can generally also be provided before and/or after the HX in the architecture in accordance with 10 so that an operation independent of the RFANs would be possible. In this case, cooling air is sucked from the recirculation lines via the mixing chamber MIX by means of the separate fan of the HX. Air is then also sucked from the further zones and from the cockpit without the use of isolation valves. The reverse operation, i.e. the suction from Zone 1 and the injection into further zones and into the cockpit is equally conceivable.

Figure 11:
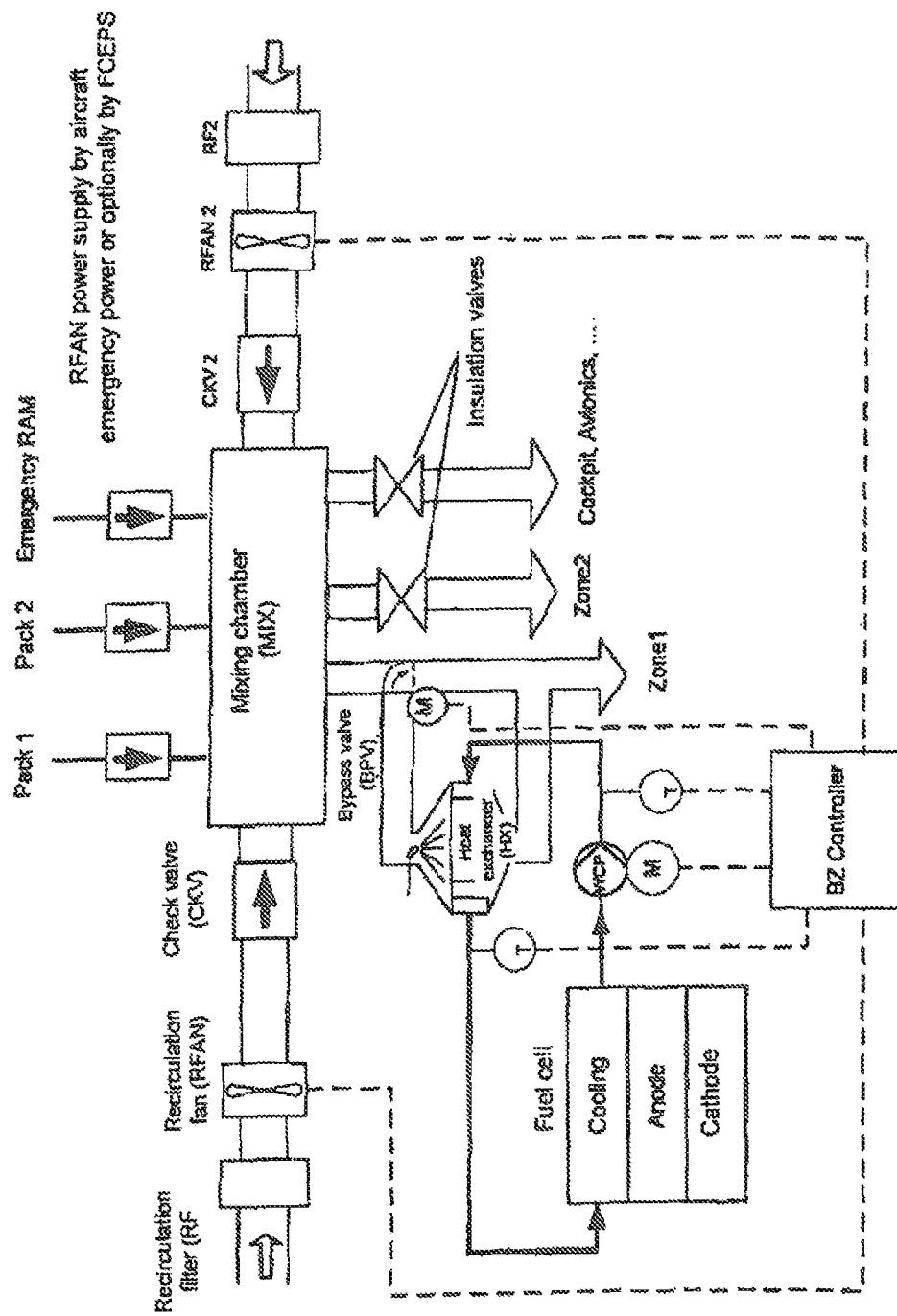
FIG. 11: a schematic representation of an architecture with a decentralized heat introduction with RFANs and an arrangement of the HX parallel to the zone outflow.

FIG. 11 shows an architecture with a decentralized heat introduction in which the HX is arranged parallel to a zone outlet of the MIX. A BPV is arranged in the zone outflow and leads the air flow through the zone outlet into the Zone 1 in normal operation. In emergency operation, the air is conducted via the bypass line through the HX. The air inflow line and the exhaust air line of the HX open into the zone outflow. Alternatively, the BPV can also be integrated directly into the mixing chamber, with in this case an isolation valve being advantageous in all zone outflows. It is also conceivable to integrate a separate fan for the HX before and/or after the HX so that an operation independent of the RFANs would be possible. In this respect, the cooling air is sucked from the lines or recirculation lines via the MIX. If no isolation valves are provided, the air is sucked from the further zones and from the cockpit. The reverse operation (suction from Zone 1 and a blowing into the further zones and into the cockpit) is equally conceivable.

Figure 12:
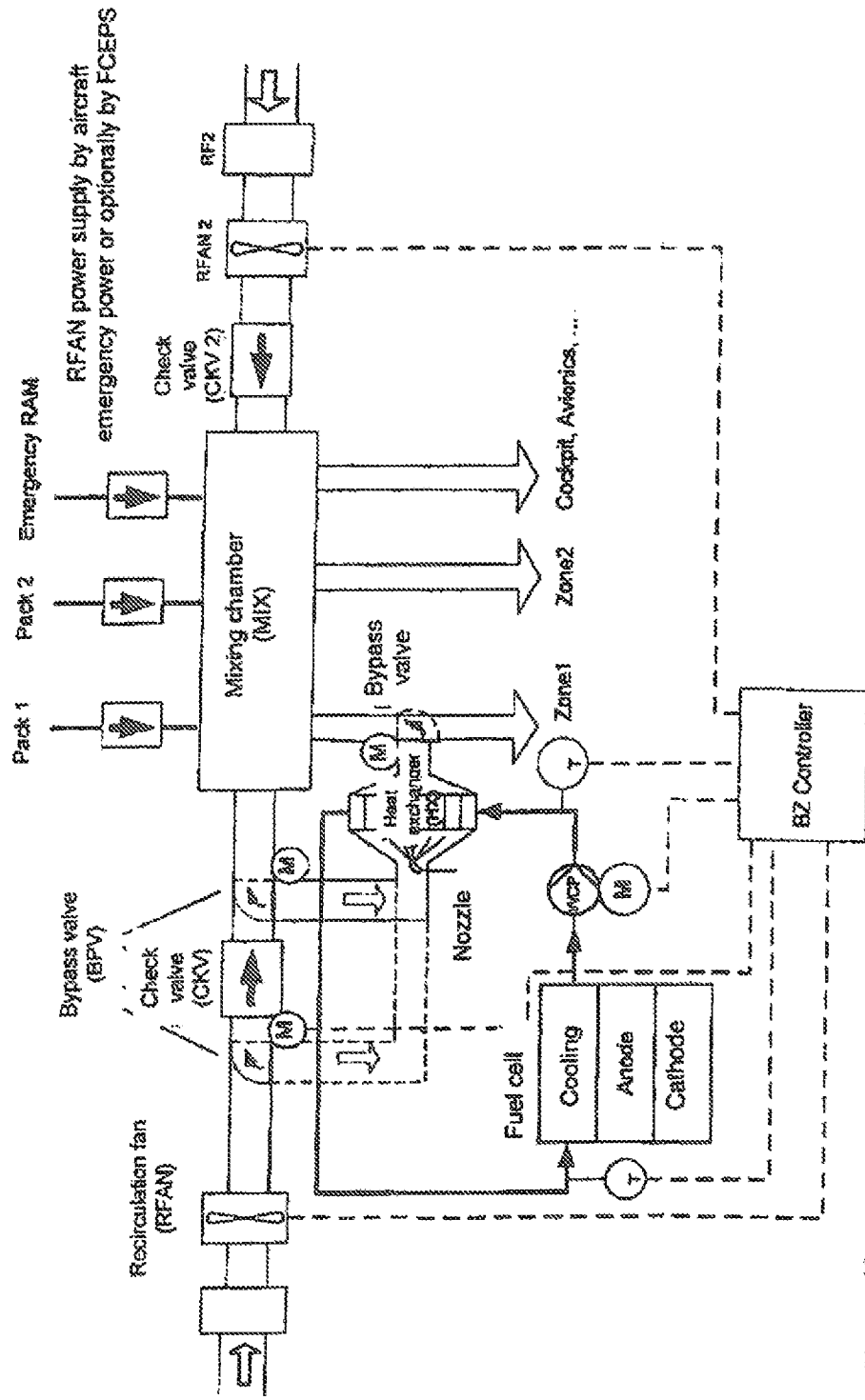
FIG. 12: a schematic representation of an architecture with a decentralized heat introduction with RFANs and an arrangement of the HX between the recirculation fan outflow and a zone outflow.
Figure 13:
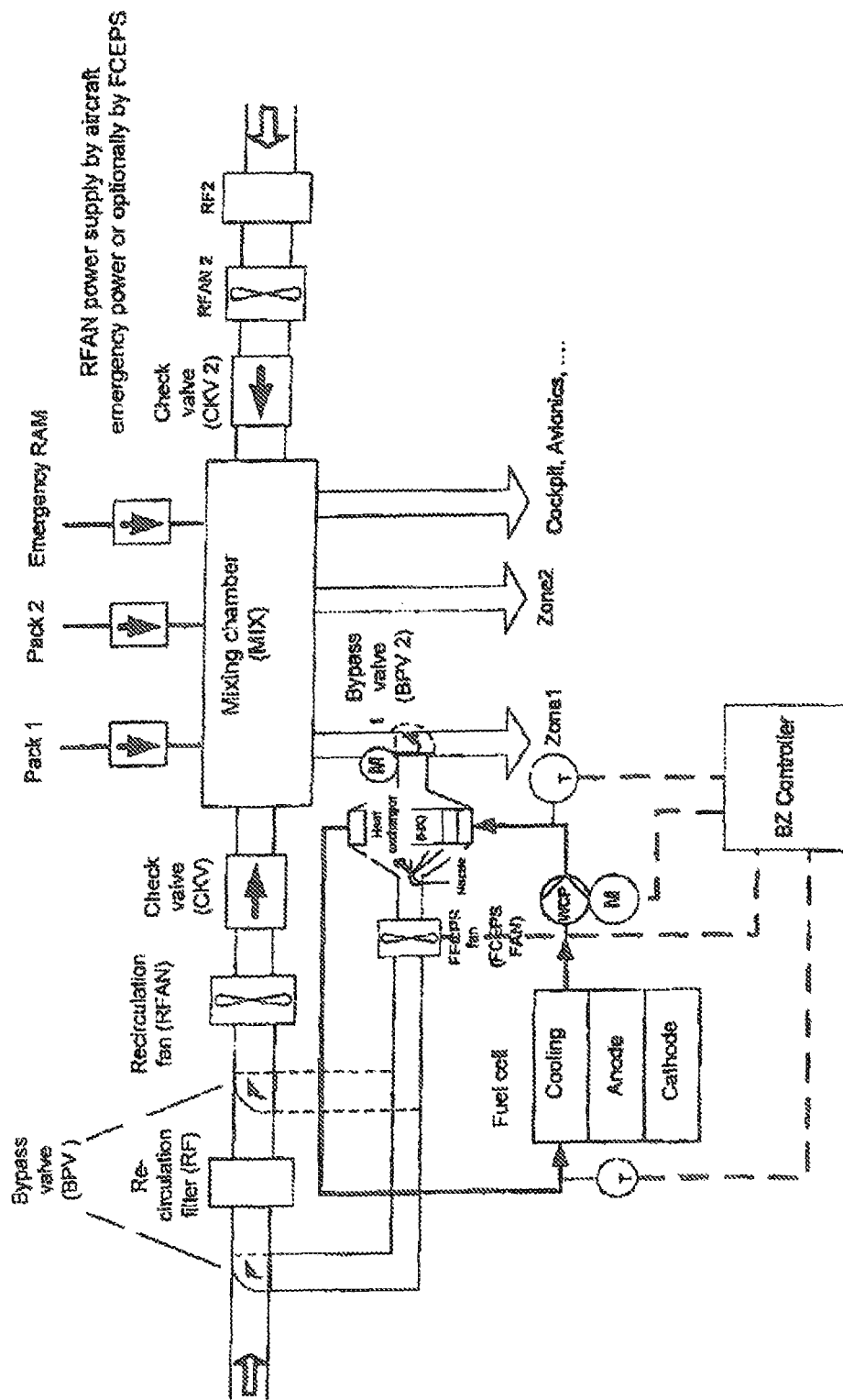
FIG. 13: a schematic representation of an architecture with a decentralized heat introduction with RFANs and an arrangement of the HX between a position upstream of the RFAN and a zone outflow.

FIG. 12 shows an architecture with a decentralized heat introduction, wherein the HX is arranged parallel to the mixing chamber. An inflow air line for the HX is provided which branches off from the line or recirculation line leading into the MIX at any desired point between the RFAN and the MIX. Air is thus conducted into the branch line and thus into the HX by means of the RFAN. One or more optional CDs can be installed between further RFANs and the MIX for reasons of redundancy. The HX exhaust air is conducted into a zone outflow. One or more BPVs are provided which block or release the air inflow line and/or the exhaust air line of the HX. Isolation valves are necessary to block the air injection into further zones which are also supplied with air from the MIX. Alternatively to isolation valves, it can also be possible to position a BPV between the MIX and the inflow from the HX. FIG. 13 finally shows an arrangement in which the HX is arranged parallel to the MIX between any desired air-conducting pipe/passage before the RFAN and a zone outflow of the MIX. The air supply over the HX is ensured by a separate fan of the HX (FCEPS FAN). Optionally, one or more connection lines could lead to one or more RFANs. On the failure of a recirculation fan and also in the above-shown embodiments, it could thus be possible to switch over to a further RFAN or to use both or a plurality of RFANs for cooling. Only one bypass valve between the MIX and the HX output is required to avoid air injection from the HX outflow into the MIX. It is also conceivable to install isolation valves into all other zones or other outflows, whereby a flow of heated air into the corresponding zones or into the cockpit, avionics, etc. is avoided. The FCEPS FAN can be provided before and/or after the HX.

Figure 14:
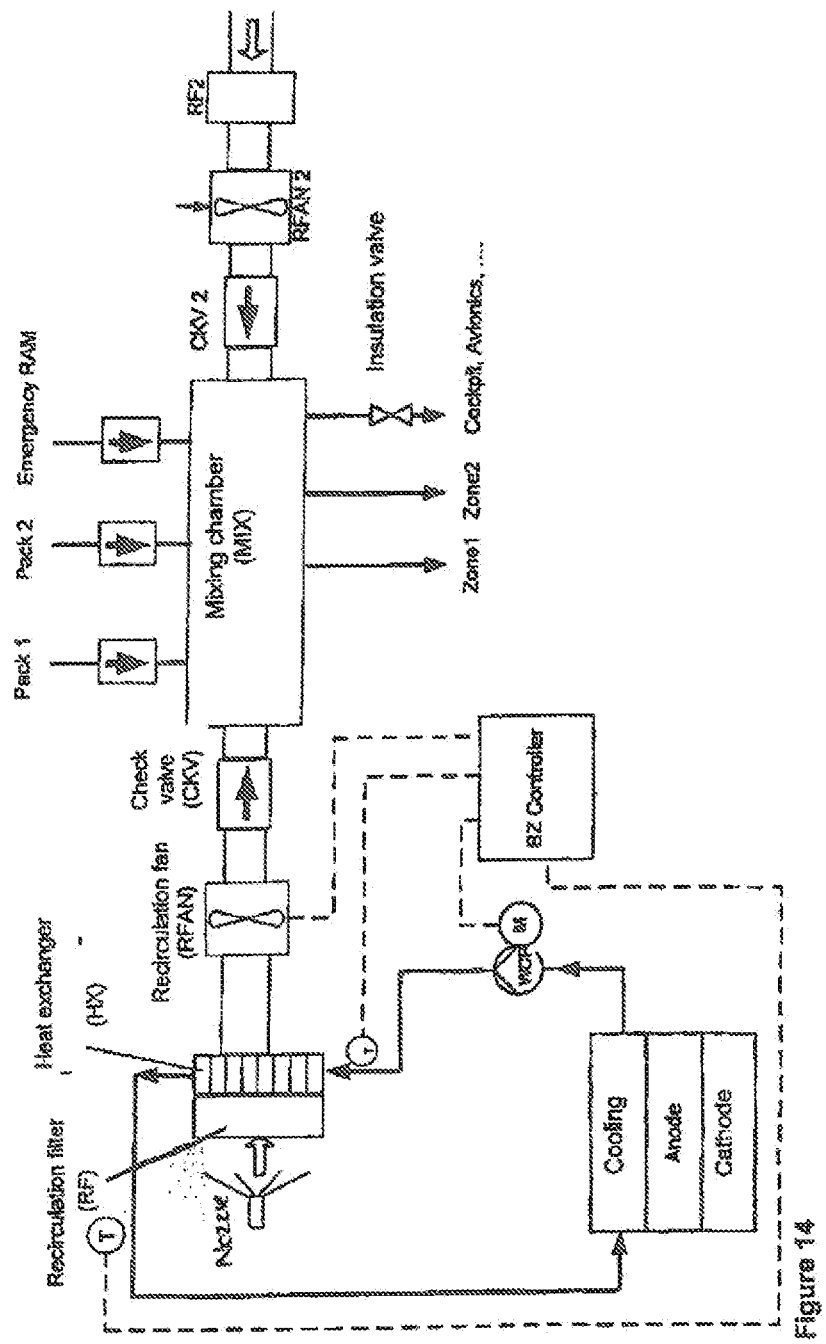
FIG. 14: a schematic representation of an architecture with a central heat introduction with RFANs and an arrangement of the HX directly in the suction train of the RFAN downstream of the recirculation filter RF.
Figure 15:
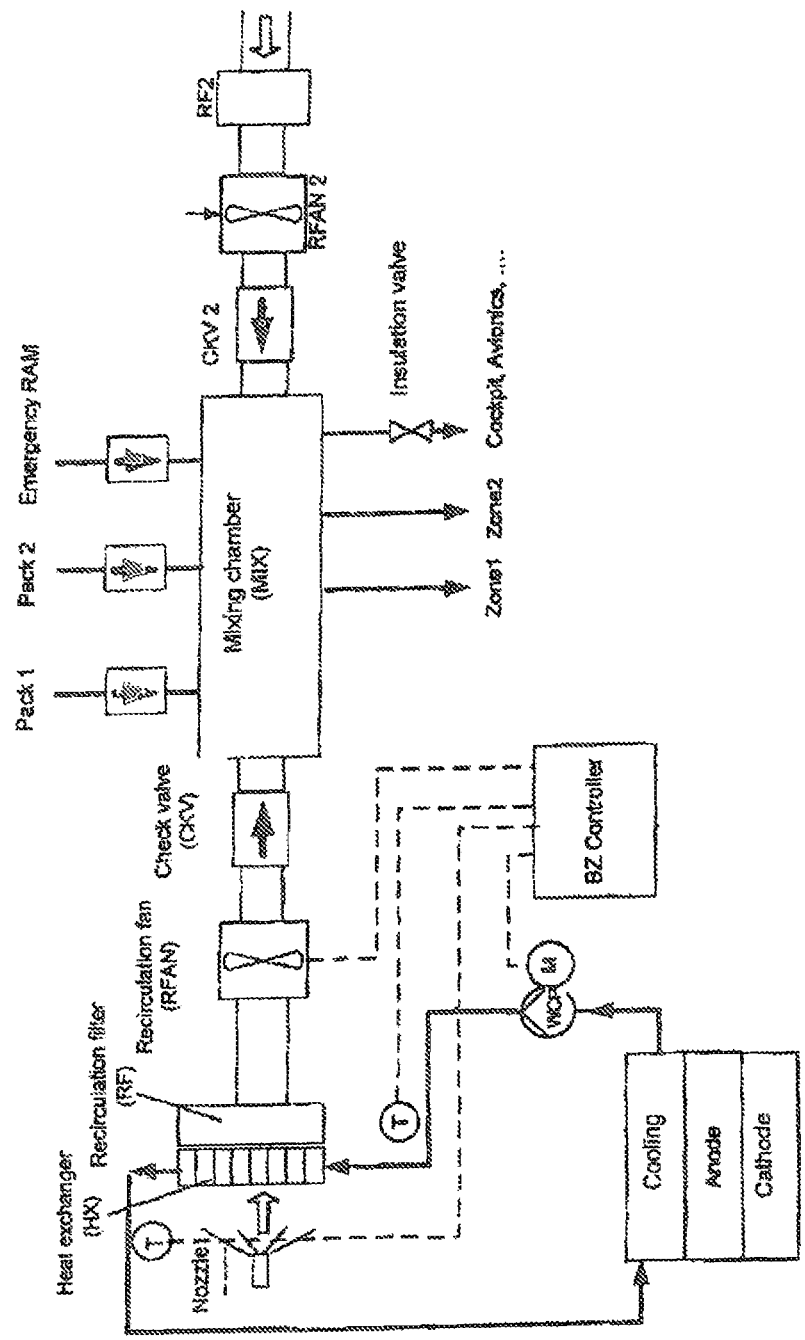
FIG. 15: a schematic representation of an architecture with a central heat introduction with RFANs and an arrangement of the HX directly in the suction train of the RFAN upstream of the recirculation filter RF.

FIG. 14 shows an arrangement in which the heat exchanger HX of the fuel cell or of the fuel cell system FCEPS is arranged directly, that is, without the use of a branch line, in the suction train of the recirculation fan RFAN. If a recirculation filter RF is used, the heat exchanger HX can be arranged downstream (FIG. 14) or upstream (FIG. 15) of the recirculation filter RF.

In both cases, higher pressure losses admittedly arise in normal operation due to this arrangement of the HX, which requires a higher fan power of the RFAN, but no further components are required for integration such as the bypass valve BPV or a line branching off from or opening into the recirculation valve in which the HX or the fuel cell is arranged.

The water injection for cooling the HX takes place either directly onto the recirculation filter RF or onto the HX.

This arrangement of the heat exchanger can naturally also be arranged in the second air train which is shown at the right in each case in the Figures. This does not only apply to the embodiments in accordance with FIGS. 14 and 15, but to all forms and embodiments of the present invention.

Figure 16:
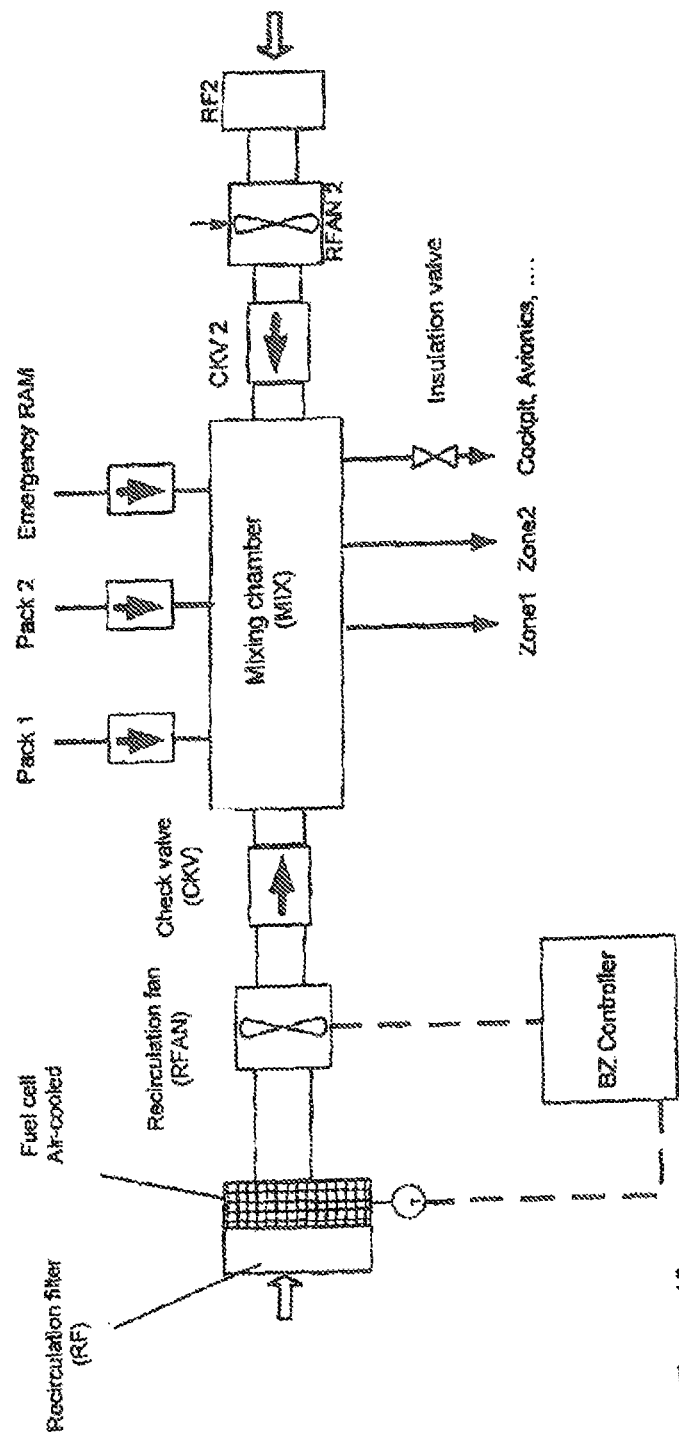
FIG. 16: a schematic representation of an architecture with an air-cooled fuel cell.

FIG. 16 finally shows an arrangement in which an air-cooled fuel cell is used. As can be seen from FIG. 16, the fuel cell is arranged in the suction train of the recirculation fan RFAN. It thus replaces the heat exchanger HX. The fuel cell outputs its waste heat directly into the air distribution system. A simplification of the fuel cell system FECPS thereby results since the required cooling system for a water-cooled fuel cell in accordance with the above embodiments can be dispensed with. It is, however, generally conceivable additionally to cool the fuel cell by a cooling system in particular in accordance with one of the aforesaid embodiments.

FIG. 16 shows only one possible architecture for the use of an air-cooled fuel cell. All further architectures in the further Figures and embodiments can likewise be equipped with one or more air-cooled fuel cells alternatively or additionally to the use of a heat exchanger HX.

The quantity of the cooling air flow through the fuel cell for setting the operating temperature can take place by a regulation of the RFAN, preferably controlled by the fuel cell system controller (BZ controller).

It also applies to the arrangement in accordance with FIG. 16 that a further fuel cell can also be installed in the second air train (RFAN2, RF2, etc.) shown at the right to increase the system redundancy.

In the embodiment in accordance with FIG. 16, the fuel cell is arranged in the suction train of the recirculation fan RFAN, and indeed downstream of a recirculation filter RF. The use upstream of the recirculation filter is generally also conceivable.

Preferred embodiments of the present invention which can be used in isolation or also in combination are reproduced again in the following:
- internal heat removal of the HX with the aid of one or more existing RFANs or separate fans of the HX or of the emergency power system;
- differentiation into central and decentralized heat introductions or heat removal in pressure operation or suction operation;
- one or more BPVS to avoid pressure losses in the RF;
- one or more isolation valves to avoid the desired heat introduction from the MIX into specific zones such as the cockpit, avionics, etc.;
- CD(s) to enable suction via a plurality of RFANs;
- central heat introduction in pressure operation with one or more recirculation fans or separate fans or decentralized heat introduction in pressure operation with a separate fan;
- global reversal of the air flow, operation in suction operation;
- cooling of the fuel cell only via RFAN or separate FAN without a thermostat valve in the fuel cell system;
- arrangement of HX in the zone outflow;
- arrangement of the cooling air from any desired air-conducting pipe/passage;
- arrangement of HX after the RFAN;
- blowing of the HX exhaust air directly into a zone outflow;
- arrangement of the HX parallel to the MIX and/or further components.

The invention claimed is:
1. A method of providing electric power to an aircraft in an emergency comprising the steps of
operating an emergency power system for the aircraft such that electric energy is provided to the aircraft in an emergency upon breakdown or failure of a main power system of the aircraft, wherein the emergency power system comprises at least one fuel cell unit for generating the electrical energy,
connecting the fuel cell unit by at least one air distribution system of the aircraft to a cabin of the aircraft, in emergency operation of the emergency power system, exhausting heated air generated by the fuel cell unit over the air distribution system and distributing said heated air into the aircraft cabin for internal cooling of the fuel cell unit in a pressure mode and withdrawing air from the aircraft cabin in a suction mode, selectively additionally cooling the fuel cell unit during said emergency operation in said pressure mode and said suction mode by at least one separate cooling circuit comprising at least one heat exchanger receiving the air from the aircraft cabin, cooling the heated air generated by the fuel cell by the heat exchanger, and exhausting the heated air generated by the heat exchanger downstream of the heat exchanger over the air distribution system and distributing the heated air into the aircraft cabin for internal cooling of the fuel cell unit.

2. The method of claim 1, wherein the air distribution system comprises a mixing chamber, or at least one distribution line, and comprising the additional step of introducing into the mixing chamber, exhaust air of the heat exchanger and/or the fuel cell unit by pressure operation or removing from the mixing chamber, inflow air of the heat exchanger and/or the fuel cell unit by suction operation.

3. The method of claim 1, comprising the additional step of supplying the fuel cell unit with air from the environment of the fuel cell unit, from the environment of the heat exchanger, from at least one pipe or passage, or from at least one other air inflow line.

4. The method of claim 1, wherein a regulation unit and at least one fan are provided, and comprising the additional step of regulating power of the at least one fan or carrying out an on/off control of the at least one fan with the regulating unit, wherein the fan is at least one of a recirculation fan of the air distribution system or a separate fan associated with the fuel cell unit.

5. The method of claim 1, comprising the additional step of providing at least one isolation valve such that one or more zones of the aircraft cabin can be blocked and not charged with the heated air generated by the heat exchanger and/or fuel cell unit.

6. The method of claim 1, wherein the air distribution system comprises at least one recirculation fan, at least one line or recirculation line which opens into a mixing chamber of the air distribution system and into which line air flow can be produced by the recirculation fan, and comprising the additional step of opening at least one exhaust air line of the heat exchanger and/or the fuel cell unit into the line downstream or upstream of the recirculation fan.

7. The method of claim 6, comprising the additional steps of arranging at least one recirculation filter in the line upstream of the recirculation fan, and opening the exhaust air line of the heat exchanger and/or of the fuel cell unit into the line between the recirculation filter and the recirculation fan.

8. The method of claim 1, wherein the air distribution system comprises at least one recirculation fan and at least one mixing chamber, and comprising the additional steps of opening at least one line or recirculation line into the mixing chamber such that an air flow is produced by the recirculation fan, and branching off at least one inflow air line of the heat exchanger and/or fuel cell unit from the line downstream or upstream of the recirculation fan.

9. The method of claim 8, wherein at least one recirculation filter is provided in a conduit of the recirculation line upstream of the recirculation fan, and comprising the additional step of branching off an inflow line of the heat exchanger and/or fuel cell unit from the recirculation line, upstream of the recirculation filter and the recirculation fan, between the recirculation filter and the recirculation fan, or downstream of the recirculation filter and the recirculation fan.

10. The method of claim 9, wherein a plurality of recirculation fans, having at least one exhaust air line or at least one inflow air line, are provided in the air distribution system, and comprising the additional step of connecting the at least one exhaust air line or at least one inflow air line during emergency operation, to at least one exhaust air line or at least one inflow air line of the heat exchanger and/or of the fuel cell unit by at least one connection line.

11. The method of claim 1, comprising the additional step of arranging at least one bypass valve such that it enables a throughflow of a line of the air distribution system without a throughflow of the heat exchanger and/or the fuel cell unit when in a first position and enables a throughflow of the heat exchanger and/or the fuel cell unit in a second position, is provided.

12. The method of claim 1, comprising the additional step of arranging at least one recirculation fan such that the heat exchanger and/or the fuel cell unit is directly in the suction train of the recirculation fan.

13. The method of claim 1, comprising the additional step of providing and arranging at least one fan in association with the fuel cell unit and upstream and/or downstream of the fuel cell unit, opening at least one exhaust air line of the heat exchanger and/or the fuel cell unit into one of a mixing chamber of the air distribution system or an air distribution line of the air distribution system, and arranging the heat exchanger and/or fuel cell unit such that inflow air is supplied to it from the environment of the fuel cell unit, from the heat exchanger, from at least one pipe or passage, or from at least one other inflow line.

14. The method of claim 13, comprising the additional step of connecting the inflow line of the heat exchanger and/or fuel cell unit to a mixing chamber of the air distribution system or branching off the inflow line of the heat exchanger from a line or recirculation line such that air can be conducted into a mixing chamber of the air distribution system by a recirculation fan of the air distribution system.

15. The method of claim 1, wherein the air distribution system comprises a mixing chamber having at least one exhaust air line by which air is conducted from a mixing chamber of the air distribution system into at least one zone of the aircraft cabin, and comprising the additional step of arranging the heat exchanger and/or fuel system such that it is flowed through by air flowing through the exhaust air line of the mixing chamber of the air distribution system, wherein the air throughflow of the heat exchanger and/or the fuel cell unit takes place by at least one recirculation fan of the air distribution system and/or at least one fan associated with the fuel cell unit and arranged upstream and/or downstream of the heat exchanger and/or of the fuel cell unit.

16. The method of claim 1, wherein a mixing chamber of the air distribution system is provided, such that the mixing chamber has at least one exhaust air line by which air can be conducted from the mixing chamber into at least one zone of the aircraft cabin, and comprising the additional step of branching at least one line off from the exhaust air line of the mixing chamber of the air distribution system, in which line the heat exchanger and/or the fuel cell unit is arranged such that it is flowed through by air flowing through the branched line.

17. The method of claim 1, wherein at least one line or recirculation line is provided through which air can be conducted by at least one recirculation fan into a mixing chamber of the air distribution system, and comprising the additional step of branching at least one exhaust air line off from the line downstream of the recirculation fan, by which exhaust air line air can be supplied to the heat exchanger and/or the fuel cell unit, and wherein a mixing chamber of the air distribution system has at least one exhaust air line into which the exhaust air line of the heat exchanger and/or the fuel cell unit opens.

18. The method of claim 1, wherein at least one line or recirculation line is provided by which air can be conducted by at least one recirculation fan into a mixing chamber of the air distribution system, and comprising the additional steps of branching at least one exhaust air line off from the line downstream of the recirculation fan by which exhaust air can be supplied to the heat exchanger and/or to the fuel cell unit with at least one fan associated with the fuel cell unit being provided downstream and/or upstream of the heat exchanger and/or of the fuel cell unit by which fan a throughflow of the heat exchanger and/or the fuel cell unit can be produced, and providing a mixing chamber of the air distribution system with at least one exhaust air line into which at least one exhaust air line of the heat exchanger and/or the fuel cell unit opens.

* * * * *